C. C. LILLIBRIDGE.
ELECTRIC COOKER.
APPLICATION FILED AUG. 12, 1912.
1,065,148.
Patented June 17, 1913.
2 SHEETS—SHEET 1.
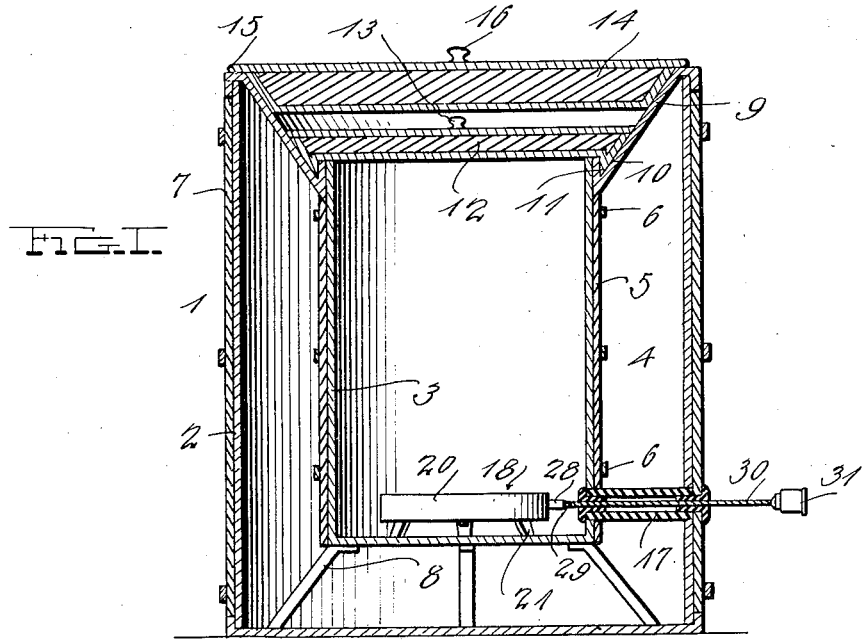
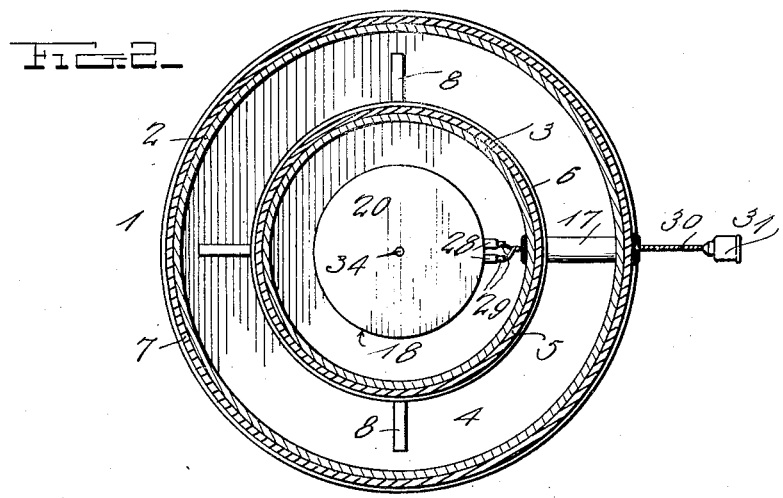
Witnesses
Inventor
C. C. Lillibridge
Attorneys

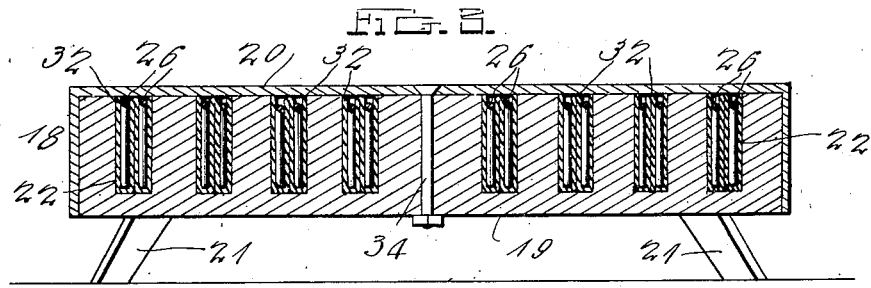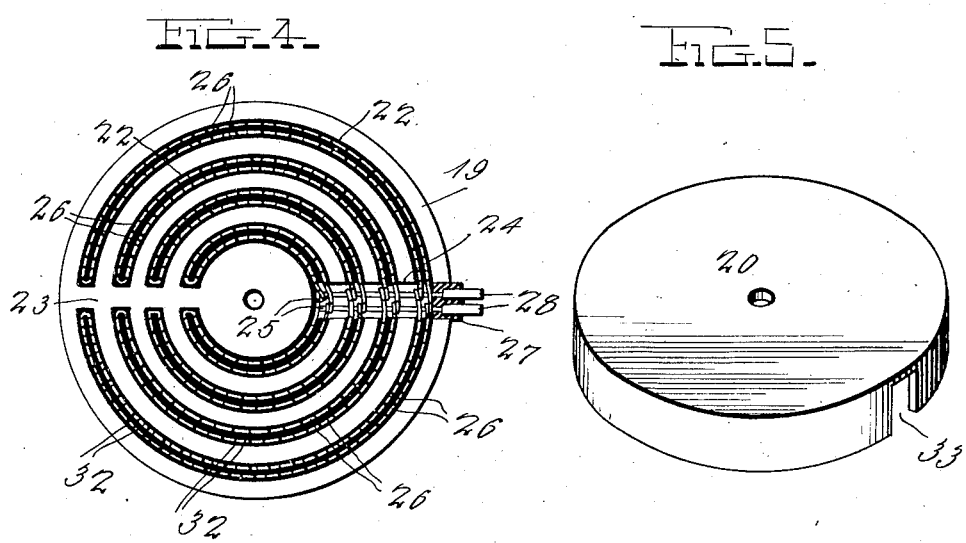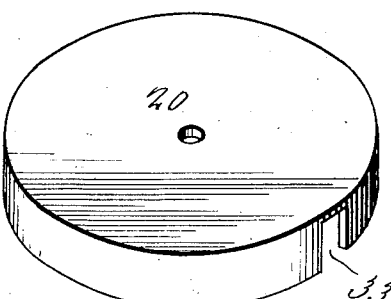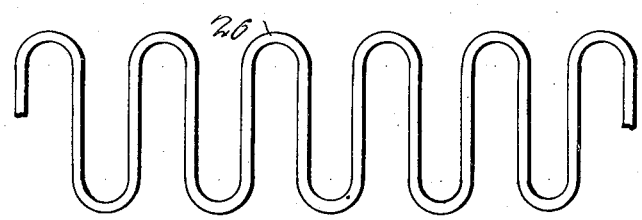

UNITED STATES PATENT OFFICE.

CURTIS C. LILLIBRIDGE, OF HUTCHINSON, KANSAS.

ELECTRIC COOKER.

1,065,148.   Specification of Letters Patent.   Patented June 17, 1913.

Application filed August 12, 1912. Serial No. 714,791.

*To all whom it may concern:*

Be it known that I, CURTIS C. LILLIBRIDGE, a citizen of the United States, residing at Hutchinson, in the county of Reno and State of Kansas, have invented certain new and useful Improvements in Electric Cookers; and I do declare the following to be a full, clear, and exact description of the invention, such as will enable others skilled in the art to which it appertains to make and use the same.

This invention relates to improvements in cookers.

One object of the invention is to provide a cooker having an improved construction and arrangement of electric heat radiator adapted to be removably engaged with the cooker and which is heated when in the cooker so that while the radiator is being heated the cooker is being simultaneously heated by the same current which heats the radiator thereby greatly facilitating the cooking operation and saving the current which is cut off as soon as the radiator is sufficiently heated.

Another object is to provide a cooker having an improved construction of casing or body whereby the heat is effectually retained therein.

In the accompanying drawings; Figure 1 is a vertical section of my improved cooker; Fig. 2 is a horizontal section of the same; Fig. 3 is an enlarged central vertical section of the electric heat radiator of the cooker; Fig. 4 is a plan view of the radiator with the top member thereof removed; Fig. 5 is a perspective view of the top member of the radiator; Fig. 6 is a detail view of one of the heating coils of the radiator.

My improved radiator comprises a casing 1 which may be of any suitable size and shape and which consists of an outer member 2 and an inner member 3 which is spaced a suitable distance from the sides and bottom of the outer member to form a dead air space 4 which entirely surrounds the sides and bottom of the inner member 3. The side and bottom walls of the members 2 and 3 may be formed of any suitable material but are preferably constructed of sheet metal. The inner member 3 is provided with a covering 5 of asbestos or other heat retaining material which is preferably applied thereto in the form of a sheet which is wrapped around the outer side of the member and is securely held in position thereon by metal bands 6. The outer member 2 is also provided with a covering 7 of asbestos or other suitable heat retaining material which is wrapped around or otherwsie applied thereto in sheet form as shown.

The inner member 3 is of considerably less diameter and is also much shorter than the outer member and said inner member is supported concentrically within the outer member by supporting legs 8 as shown. Connected with the upper end of the inner member 3 and with the upper end of the outer member 4 is an inclined flange 9 which covers the upper end of the space between the sides of the inner and outer members. The lower end of the flange 9 is secured to the outer side of the upper end of the member 3 a short distance below the upper end of said inner member and forms an annular space 10 between the projecting upper end of the member 3 and the lower portion of the flange, said space being adapted to receive water for forming a seal with the flanged lower edge 11 of an inner cover 12 which is engaged with the upper edge of the member 3 within the flange 9 as shown. The edges of the cover 12 are beveled to correspond with the angle of the flange 9 with which said edge of the cover is engaged. The cover 12 is provided with a suitable knob 13 for removing and replacing the same, and engaged with the space above the inner cover 12 is an outer or upper cover 14 having a beveled edge which engages the upper portion of the flange 9. The cover 14 is also provided on its upper edge with an annular flange 15 which engages and rests on the upper edge of the flange 9 and outer member 7 of the casing. The cover 14 is also provided with a knob 16 whereby this cover may be readily handled. By providing the inner and outer covers 12 and 14 and the water seal 11 an absolutely water tight closure will be provided for the upper end of the cooker which will positively prevent any of the heat from escaping therefrom. Arranged in the space 4 between the outer and inner members 2 and 3 of the casing and opening through the same is a tube 17 the purpose of which will be hereinafter described.

My improved cooker is provided with an electric heat radiator 18 comprising a base member 19 in the form of a thick metal plate which is here shown and is preferably of circular form and with which is removably engaged an upper sheet metal cap or casing 20 which forms the upper member of the radiator. The base member 19 of the radiator is preferably provided with short feet 21 whereby the radiator is supported a slight distance above the bottom of the inner member of the cooker when the radiator is placed in position therein. In the upper side of the radiator are concentric rows of segmental grooves or channels 22 which are closed at one end by a radially projecting rib or web 23 and which communicate at their opposite ends with a radially disposed passage 24 through which the ends of the current conducting wires 25 are inserted and connected with the electric resistance or heating coils 26 which are arranged in the grooves or channels 22 as shown. The outer ends of the wires 25 pass through a block 27 of insulation and are connected with sockets 28. The sockets 28 project a short distance beyond the block 27 and are adapted to receive plugs 29 to which the inner ends of electric current conducting wires 30 are connected, said wires passing through the tube 17 which connects the inner and outer members of the casing as clearly shown in Fig. 1 of the drawing. The outer ends of the wires 30 are connected with a socket 31 with which is adapted to be engaged the plug of a current conducting cord leading to a fixture or other stationary connection.

The coils 26 are embedded or incased in a covering 32 of mica or other suitable insulating material with which the grooves 22 in the base of the radiator are lined and the inner ends of the coils terminate in the grooves near the rib 23 of said base member of the radiator. The upper sheet metal cap or member 20 of the radiator is provided in one edge with a notch 33 which is adapted to receive the block of insulation 27 when the cap is placed in position on the base member of the radiator, and when in position said cap is preferably fastened by a bolt 34 which is engaged with centrally disposed alined bolt holes in the base and cap member of the radiator. By providing the radiator with a thin cap or other member the heat from the coils 26, while heating the base portion of the radiator will also pass through said cap and will thus heat the upper portion of the cooker at the same time that the radiator is being heated, this heat thus being utilized instead of being wasted, which would occur should the radiator be heated outside the cooker. As soon as the radiator has been sufficiently heated the current may be turned off and the heat radiating from the radiator will be retained in the cooker as will be readily understood.

It will also be understood that other forms of radiators may be heated and applied to the cooker without removing the electric radiator herein shown and described.

Having thus described my invention, what I claim is;

1. A cooker comprising a casing consisting of inner and outer members, air tight covers for the casing, an electric radiator arranged in said inner member of the casing and comprising a base member having in its upper side series of concentric segmental grooves closed at one end with a radially disposed rib and at their opposite ends with a radial passage opening through the side of the base, and an insulating block arranged in the outer end of said passage, coil connecting wires extending through said block and passage, insulated electric heating coils arranged in said grooves and connected at one end with said wires, sockets arranged on the outer ends of the wires, a sheet metal cap engaged with said base member to cover said grooves and the coils therein, current conducting wires arranged through one side of said casing and having on their inner ends plugs to engage the sockets on the ends of the wires in said radiator and an electrical connector a socket on the outer end of said current conducting wires.

2. A cooker comprising a casing consisting of inner and outer members spaced apart to form a surrounding dead air space, heat retaining coverings arranged around said members, a water seal formed at the upper end of the inner member, an inner cover having a flange adapted to engage said water seal, an outer cover arranged above said inner cover, said covers forming an air tight closure for the cooker and an electric radiator arranged in the inner member of the casing and comprising a base member having arranged therein series of heating coils, a thin metal cap adapted to be engaged with said base member to cover said coils, and electric conducting wires arranged through the casing of the cooker and adapted to be connected with the coils in the radiator whereby the latter is heated.

3. A cooker of the character described, comprising a solid circular base member, said member having formed in its upper side a plurality of concentric segmental grooves, a radially disposed web constituting one end of the grooves, the opposite ends being in communication with a radial channel which opens through the side of said base member, an insulating block arranged in the outer end of said channel, coil connecting wires extending radially through said block and channel, insulated electric heating coils vertically arranged and transversely folded in said grooves, whereby the ends of said coils are engaged with the connecting wires, sockets arranged on the outer ends of said connecting wires to receive the ends of the current conducting wires, a sheet metal cap to cover said base member and formed with a surrounding depending flange having a notch to receive said block, and a fastening passed centrally through the cap and into the base member to detachably fasten the cap thereto.

In testimony whereof I have hereunto set my hand in presence of two subscribing witnesses.

CURTIS C. LILLIBRIDGE.

Witnesses:
C. W. McDaniel,
J. H. Bryan.